Feb. 4, 1969 K. BEISSWENGER 3,425,304
SPINDLE FEED MECHANISM FOR A SLIDE
Filed Sept. 14, 1966
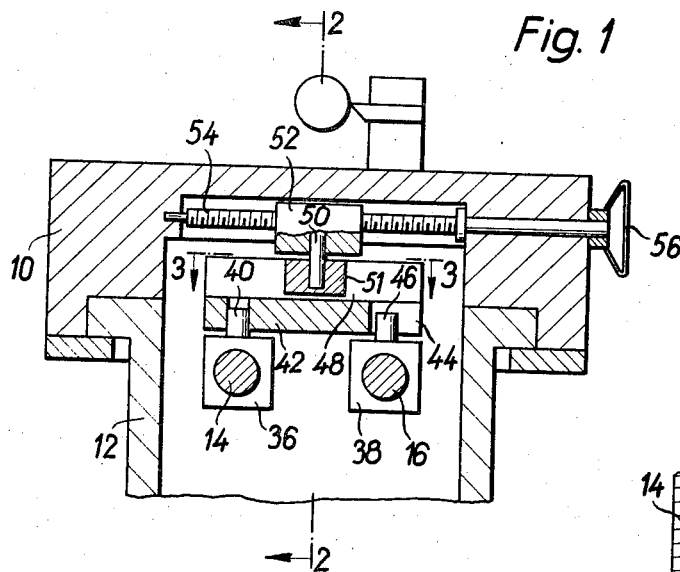
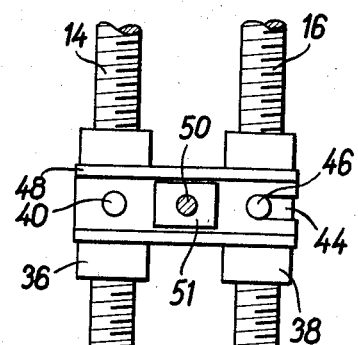
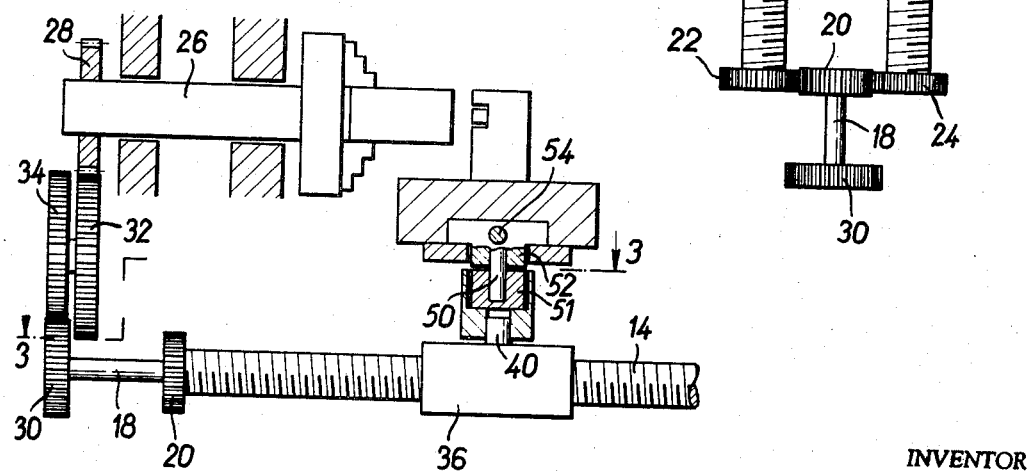
INVENTOR
Karl Beisswenger
BY
ATTORNEY US Patent Office 3,425,304
Patented Feb. 4, 1969

3,425,304
SPINDLE FEED MECHANISM FOR A SLIDE
Karl Beisswenger, 38 Hauptstrasse, 7321
Bortlingen, Germany
Filed Sept. 14, 1966, Ser. No. 579,422
Claims priority, application Germany, Sept. 21, 1965,
B 83,820
U.S. Cl. 82—21                3 Claims
Int. Cl. B23b 21/00; F16h 1/18, 1/20

ABSTRACT OF THE DISCLOSURE

A feed mechanism for a slide guided on a frame comprises a pair of threaded spindles rotatably mounted on the frame, each spindle engaging a nut. The nuts are connected by a lever; and the lever is adjustably connected with the slide. Owing to a difference of the leads of the spindles or owing to different rotary speeds of the spindles, the nuts travel with slightly differing speeds. The velocity of feed of the slide is adjustable by adjustment of the connection between the lever and the slide.

---

My invention relates to a spindle feed mechanism for a slide, particularly a slide of a machine tool. More especially, my invention relates to a mechanism of this type in which the feed motion is imparted to a slide or carriage of a machine tool by a rotary spindle, means being provided for adjusting the increment of the feed motion produced by each revolution of the spindle. Such adjustment offers the advantage, for instance, of affording a possibility of compensating any change of length of the spindle owing to heat distortion in the hardening treatment of the spindle.

More particularly, it is an object of my invention to provide improved means for a continuous variation, as distinguished from a stepwise variation, of said increment of the feed motion.

It is a further object of my invention to provide simple and reliable means for effecting the adjustment described in a simple manner, for instance by means of an adjusting knob which can be easily manipulated without requiring disassembly of the spindle fed mechanism.

Further objects of my invention will appear from a detailed description of a preferred embodiment of my invention with reference to the accompanying drawings. It is to be understood, however, that such detailed description serves the purpose of explaining rather than that of restricting or limiting my invention.

In the drawings:

FIG. 1 illustrates a vertical cross-section taken through the frame of a machine tool, a slide movably guided thereon and a pair of threaded spindles, FIG. 2 is the vertical section taken along the plane 2—2 of FIG. 1 and FIG. 3 is the horizontal section taken along the plane 3—3 of FIGS. 1 and 2.

The frame 12 of a machine tool, for instance a lathe, is provided with a horizontal guideway on which a slide 10 is movably mounted. Feed motion is imparted to the slide 10 by a pair of threaded spindles 14 and 16 which are rotatably mounted on the frame 12 so as to extend substantially parallel to the horizontal guideway. For this purpose bearings (not shown) are fixed to the frame 12 and the spindles 14 and 16 are non-shiftably journaled within these bearings. Suitable means are provided for driving the spindles 14 and 16. In the embodiment shown this means comprises a drive shaft 18 which is likewise journaled in bearings fixed to the frame 12 and is geared to the spindles 14 and 16. For this purpose the drive shaft 18 carries a gear 20 fixed thereto which meshes with a pinion 22 fixed to spindle 14 and with a pinion 24 fixed to the spindle 16.

In the embodiment shown the machine tool is a lathe provided with a work spindle 26 journaled in bearings mounted in a spindle housing fixed to the frame 12, the work spindle being geared to the drive shaft 18 by a suitable feed transmission. In the embodiment shown this feed transmission comprises a gear 28 fixed to the work spindle 26, a gear 30 fixed to the drive shaft 18 and a compound gear provided with two sets of teeth 32 and 34 one set meshing with gear 28 and the other one meshing with gear 30. The compound gear provided with the sets of teeth 32 and 34 is rotatably mounted in the spindle housing.

Each of the threaded spindles 14, 16 threadingly engages a nut 36, or 38 respectively, which travel at different velocities. For this purpose the two threaded spindles 14 and 18 may be provided with threads of differing leads. Alternatively, however, the spindles 14 and 16 may have threads of equal lead and may rotate at different velocities owing to the provision of the pinions 22 and 24 with different numbers of teeth. In either case the spindles are driven at speeds causing the nuts 36 and 38 to travel at different velocities.

Adjustable lever means are mounted on the slide 10 and connect the nuts 36 and 38 so as to be carried along by said nuts and to move said slide 10 at a speed depending on said velocities. These lever means can be variably adjusted so as to variably determine the speed of the slide 10. These adjustable lever means will now be described in greater detail.

The nut 36 carries an upright pin 40 on which a horizontal lever 42 is pivotally mounted. This lever extends transversely to the threaded spindles 14 and 16 and is provided with a longitudinal slot 44 disposed above the nut 38. This nut is provided with an upright pin 46 which slidingly engages the slot 44 with a minimum of clearance. If desired, a block slidably guided in the slot 44 may be mounted on the pin 46.

The lever 42 connecting the two nuts 36 and 38 is cooperatively connected with the slide 10 at a point intermediate the nuts. For this purpose the lever 42 is provided at its top with a longitudinal slot 48 in which a block 51 is slidably mounted. This block 51 is rotatably mounted on a pin 50 carried by and extending downwardly from a nut 52 threadingly engaged by a horizontal spindle 54. This spindle extends transversely to the threaded spindles 14 and 16 and is rotatably mounted in the slide 10. Its front end projects from the front face of the slide 10 and carries a knob 56 for manual rotation. When the operator rotates the spindle 54, the nut 52 will travel thereon and will thereby displace the pin 50 and the block 51 thereon. When the block 51 is so adjusted as to be equally spaced from the threaded spindles 14 and 16, equal shares of the velocities of the nuts 36 and 38 will be imparted to the slide 10. Therefore, the speed of the slide 10 will amount to the average of the velocities of the nuts 36 and 38. When the operator adjusts the nut 52 to a position in which the pin 50 is located coaxially to the pin 40, the feeding speed of the slide 10 will equal the velocity of the nut 36. When the operator, however, adjusts the nut 52 so as to place the pin 50 coaxial to the pin 46, the feeding speed of the slide 10 will equal the velocity of the nut 38.

Hence, it will appear that the operator may continuously variably determine the feeding speed imparted to the slide 10 to any amount intermediate the velocities of the nuts 36 and 38.

If desired, the block 51 may be fixed to the lever 42 and the pin 40 may extend into a longitudinal slot of the lever just as the pin 46 extends into the longitudinal slot 44.

Let it be assumed by way of example that any revolution of the shaft 18 will impart a feed motion of 9.9 mm. to nut 36 and a feed motion of 10.1 mm. to nut 38. By suitable manipulation of the knob 56 the operator may continuously vary the feed motion of slide 10 between the two limits of 9.9 and 10.1 mm. This range of adjustment may be enlarged by extending the longitudinal slot 48 of lever 42 beyond the nuts 36 and 38 and by extending the threaded spindle 54 throughout the full length of the slot 48.

If desired, the adjustment of nut 52 may be indicated by suitable indicating means so that the operator can readily check the adjustment of the nut.

From the above it will appear that the increment of the feed motion imparted to the slide 10 by each revolution of the shaft 18 may be readily adjusted by the operator by simple rotation of the knob 56. Therefore, this adjustment does not require any preparatory disassembly of the feed mechanism. It is another advantage of my invention that the adjustment does not require that the threaded spindles 14 and 16 be subjected to any longitudinal stresses as has been proposed heretofore for the purpose of adjusting the length of the feed motion.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:
1. In a mechanism of the character described, the combination comprising a frame having a guideway, a slide movably mounted on said guideway, a pair of threaded spindles rotatably mounted on said frame and extending substantially parallel to said guideway, a pair of nuts each engaged by one of said spindles, means for driving said spindles at speeds causing said nuts to travel at different velocities, adjustable lever means mounted on said slide and connecting said nuts so as to be carried along by said nuts and to move said slide at a speed depending on said velocities, and means for variably adjusting said lever means so as to variably determine said speed.

2. The combination claimed in claim 1 in which said adjustable lever means includes a two-armed lever pivotally mounted on said slide, each of the arms of said lever being connected with one of said nuts.

3. The combination claimed in claim 1 in which said adjustable lever means includes a two-armed lever, each of the arms of said lever being connected with one of said nuts, and mounting means for pivotally mounting said two-armed lever on said slide, said mounting means comprising a threaded adjusting spindle journaled in said slide, a nut threadingly engaged by said adjusting spindle, a pivot pin on said nut, said pivot pin engaging said two-armed lever.

References Cited
UNITED STATES PATENTS 1,112,269  9/1914  Crellin _____ 82—27 X LEONIDAS VLACHOS, *Primary Examiner.*

U.S. Cl. X.R.

74—424.8; 82—27